US012671312B2

(12) United States Patent (10) Patent No.: US 12,671,312 B2
Kulsangcharoen et al. (45) Date of Patent: Jun. 30, 2026

(54) CAPACITOR VOLTAGE BALANCING CONTROL TECHNIQUE OF MULTI-LEVEL MULTI-CHANNEL DRIVES

(71) Applicant: Hamilton Sundstrand Corporation, Charlotte, NC (US)

(72) Inventors: Ponggorn Kulsangcharoen, Solihull (GB); Ali Khalid Al-Karaghouli, Solihull (GB); Andrei Dinu, Leicester (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/940,148

(22) Filed: Nov. 7, 2024

(65) Prior Publication Data

US 2025/0158506 A1 May 15, 2025

(30) Foreign Application Priority Data

Nov. 14, 2023 (EP) ..................................... 23209771

(51) Int. Cl.
H02M 1/00 (2007.01)
H02M 1/12 (2006.01)
(Continued)

(52) U.S. Cl.
CPC ........... H02M 1/0048 (2021.05); H02M 7/44 (2013.01)

(58) Field of Classification Search
CPC ...... H02M 1/0048; H02M 7/44; H02M 1/008; H02M 1/123; H02M 7/4833; H02M 7/493;
(Continued)

(56) References Cited

U.S. PATENT DOCUMENTS 9,030,854 B2 5/2015 Escobar et al.
10,396,554 B2 * 8/2019 Chik ......................... H02J 3/00
(Continued)

FOREIGN PATENT DOCUMENTS

EP 3913785 A1 11/2021
EP 3916990 A1 12/2021
(Continued)

OTHER PUBLICATIONS

European Search Report for Application No. 23209771.7, mailed Apr. 29, 2024, 12 pages.
(Continued)

*Primary Examiner* — Rexford N Barnie
*Assistant Examiner* — Xuan Ly
(74) *Attorney, Agent, or Firm* — CANTOR COLBURN LLP

(57) ABSTRACT

A power converter for providing power to one or more loads. The power converter is configured to be arranged in a parallel configuration with one or more additional power converters. The converter includes: a load balancing controller configured to receive an input voltage demand and output a compensated output voltage demand; an inverter for receiving an input voltage and converting this to an output voltage having an associated output current, the inverter comprising at least two DC-link capacitors; and a module configured to modulate the output voltage using a modulation scheme based on the compensated output voltage demand. The load balancing controller comprises a first feedback circuit configured to generate a first signal, wherein the first signal is generated based on a first measurement/calculation of the output current of the inverter scaled by a first gain.

15 Claims, 6 Drawing Sheets

(51) Int. Cl.
| | |
|---|---|
| *H02M 7/44* | (2006.01) |
| *H02M 7/483* | (2007.01) |
| *H02M 7/493* | (2007.01) |

(58) Field of Classification Search
CPC ........ H02M 1/0025; H02M 1/00; H02M 1/12;
H02M 7/483
USPC .......................................................... 307/31
See application file for complete search history.

(56) References Cited

U.S. PATENT DOCUMENTS

| | | |
|---|---|---|
| 11,489,459 B2 | 11/2022 | Hogan et al. |
| 2023/0198436 A1 | 6/2023 | Salem et al. |

FOREIGN PATENT DOCUMENTS

| | | |
|---|---|---|
| EP | 4024649 A1 | 7/2022 |
| EP | 4243274 A1 | 9/2023 |

OTHER PUBLICATIONS

Song, et al. "A Neutral-Point Potential Balancing Algorithm for Three-Level NPC Inverters Using Analytically Injected Zero-Sequence Voltage", Eighteenth Annual IEEE Applied Power Electronics Conference and Exposition, 2003. APEC '03, Feb. 9, 2003, pp. 228-233 vol. 1.

Wei, et al. "A Circulating-Current Suppression Method for Parallel-Connected Voltage-Source Inverters with Common DC and AC Buses", IEEE Transactions on Industry Applications, vol. 53, No. 4, Jul./Aug. 2017, pp. 3758-3769.

* cited by examiner

CAPACITOR VOLTAGE BALANCING CONTROL TECHNIQUE OF MULTI-LEVEL MULTI-CHANNEL DRIVES

CROSS-REFERENCE TO RELATED APPLICATIONS

This application claims the benefit of European Patent Application No. 23209771.7 filed Nov. 14, 2023, the disclosure of which is incorporated herein by reference in its entirety.

FIELD

This invention relates generally to the field of multi-channel drives, and the control thereof.

BACKGROUND

Electronic control architectures are provided with power converters (e.g., motor drives) that form an electrical circuit which accepts an input (e.g., AC or DC) and generates an output (e.g., AC or DC) of a different voltage. The development of such power converters is a significant part of the development of a new control architecture, program or system. It is envisioned that standardised power converters could significantly reduce development costs, by providing the ability for one or more loads to be controlled using multiple power converters.

To facilitate wide power requirement ranges of the one or more loads, it may be necessary to use a plurality of power converters operating in parallel. Mutualised or multiplexed power converter architectures become more relevant as the number of electronic components increases. This is the case, for example, in the aircraft industry as more electronically controlled components are used.

In such systems, a plurality of power converters may be interfaced to one or more electrical loads through a switch or switch matrix that can reconfigure the connection between electrical loads and power converters. In the case of an aircraft, certain loads may not be used simultaneously during a flight or at the same point in time, such as a landing gear actuator and thrust reverser actuator. As such, these components can in theory be powered by the same power converter, with the switch reconfiguring the connection accordingly.

The benefit of a combined or multiplexed approach is the potential reduction of weight and increase of drive availability compared to conventional architectures.

To take the maximum advantage of the combined or multiplexing concept (in particular the latter), paralleling control architectures for motor drives is a critical technology, which enables large loads to be powered by the parallel connection of multiple drives. This avoids having to dimension one motor drive for maximum load power, for example.

Solutions for providing parallel motor drives should be aimed at reducing weight, for example of the various components used within the architecture. It has also been found that the use of scalable and modular solutions may be important in enabling motor drive inverters to operate in standalone or a parallel configuration to a variable number of motor drives (e.g., two or more drives in parallel). The aim of the present invention, as discussed in more detail below, is to achieve this without significant need for reconfiguration of the control architecture.

One example architecture that is utilised so as to allow for a multi-channel drive (MCD) system shown in FIG. 1. Such an MCD architecture is a very flexible architecture because it can be controlled and managed by a districted supervisory controller 1 (DSC) to configure any drive channels 2a, 2b, . . . , 2z to supply power to multiple loads 5a and 5b through the switch matrix 4 depending on the demand. The output filters 3a, 3b, . . . , 3z allow the system to electrically parallel two or more drives 2a, 2b, 2z to deliver more power to a single load.

Such architectures may use synchronous reference frame control, which is known in the art (also called "D-Q control" or Field Oriented Control). Using such a control mechanism, the voltage and current can be converted into a reference frame that rotates synchronously with a voltage vector (e.g., by Park Transformation) so that three-phase time-varying signals are transformed into DC signals. Using "D-Q currents" (direct and quadrature currents) provides a convenient way of representing the output current of the motor drive, and analysing the system. By utilising such control, it is possible to align the current vector with the Q-axis of a rotating DQ reference frame, in order to ensure maximum motor torque production for a given current.

However, in the case of a MCMLD system, such as the system shown in FIG. 1, an additional capacitor voltage balancer is required alongside the existing controller in order to balance DC-link capacitor voltages in the inverters. Unbalanced capacitor voltages can occur due to various reasons under different operating conditions. For instance, when the drive is enabled, an imbalanced load quickly leads to unbalanced capacitor voltages. Conversely, during idle mode, the diverging capacitor voltages can be attributed to variances in capacitance tolerances and different self-discharging rates among the capacitors. Consequently, it is crucial to monitor and control the capacitor voltages for proper system functioning.

SUMMARY

According to a first aspect, there is provided a power converter for providing power to one or more loads. The power converter is configured to be arranged in a parallel configuration with one or more additional power converters and comprises: a load balancing controller configured to receive an input voltage demand and output a compensated output voltage demand; an inverter for receiving an input voltage and converting this to an output voltage having an associated output current, the inverter comprising at least two DC-link capacitors; and a module configured to modulate the output voltage using a modulation scheme based on the compensated output voltage demand. The load balancing controller comprises a first feedback circuit configured to generate a first signal, wherein the first signal is generated based on a first measurement/calculation of the output current of the inverter scaled by a first gain, wherein the first gain is set so as to reduce circulating currents between the power converter and one or more additional power converters in the parallel configuration due to imbalance of positive and/or negative sequence currents; and a second feedback circuit comprising a first controller (430, 530) configured to calculate a first DC offset to mitigate DC-link capacitor voltage imbalances of the inverter, and a second controller (420, 520) that is configured to calculate a second DC offset to reduce zero-sequence current, wherein the second DC offset is subtracted from the first DC offset so as to result in a total voltage correction, TVC, signal. The load balancing controller is configured to compensate the received voltage demand using the first signal and the TVC signal to result in the compensated output voltage demand.

In this way, the converter may be configured to minimize both capacitor voltage unbalance and zero-sequence currents, which therefore mitigates problems that could cause the system trip and/or permanent damage to the system components if they are not controlled.

The received input voltage demand may be or may allow for determination of a DQ-axis input voltage demand, and the load balancing controller may be configured to convert the received DQ-axis input voltage demand to a corresponding ABC phase voltage demand, such that compensated output voltage demand is an ABC phase voltage demand.

The load balancing controller may be configured to apply the first signal to the DQ-axis input voltage demand to provide a compensated DQ-axis voltage demand, and to subsequently convert the compensated DQ-axis voltage demand to a corresponding ABC phase voltage demand; and the load balancing controller may be configured to apply the TVC signal to each phase of the corresponding ABC phase voltage demand so as to result in the compensated output voltage demand.

Alternatively, the load balancing controller may be configured to convert the DQ-axis input voltage demand to a corresponding ABC phase voltage demand, and the load balancing controller may be configured to apply both the first signal and the TVC signal to each phase of the corresponding ABC phase voltage demand so as to result in the compensated output voltage demand. In this way, the compensation may be applied to wither the DQ-axis voltage demand, or the ABC phase voltage demand.

The first gain may be set such that, for a range of values of the output current, a value of the first gain is chosen that reduces circulating currents between the power converter and one or more additional power converters in the parallel configuration due to imbalance of positive and/or negative sequence currents.

The first gain may be preset or otherwise predetermined as part of a calibration or pre-processing routine.

The first controller may be configured to calculate the first DC offset based on a measured DC-link capacitor voltage imbalance of the associated inverter.

The measured DC-link capacitor voltage imbalance may be a difference between the voltage of a top capacitor, and a bottom capacitor of a split DC-link capacitor having halves connected by a midpoint.

The measured DC-link capacitor voltage imbalance may be scaled by a second gain in order to provide the first DC offset, and the second gain may again be preset or otherwise predetermined as part of a calibration or pre-processing routine.

The second controller may be configured to calculate the second DC offset based on a summation of measured/calculated local currents of the inverter.

The summation of measured/calculated local currents of the inverter may be scaled by a third gain in order to provide the second DC offset, and the third gain may be preset or otherwise predetermined as part of a calibration or pre-processing routine.

The input voltage may be a DC input voltage and the output voltage may be a three-phase output voltage. The modulation scheme may include pulse width modulation.

The power converter may for part of a wider multi-channel drive to selectively power one or more loads.

In this way, according to a second aspect, there is provided a multi-channel drive, MCD, configured to provide power to at least one load, the MCD comprising: a central controller; a plurality of power converters, each power converter being a power converter according to the first aspect and each having a corresponding output filter, wherein each power converter and corresponding output filter is arranged in parallel with one another; and a switch matrix; wherein the central controller is operable to configure any number of the plurality of power converters to supply power to the at least one load through the switch matrix depending on the demand of the at least one load.

Such a drive may be found in a system. Therefore, according to a third aspect, there is provided a system comprising a plurality of loads; and the MCD of the second aspect, wherein the central controller is operable to configure any number of the plurality of power converters to supply power any of the plurality of loads through the switch matrix, depending on the demand of the load(s).

BRIEF DESCRIPTION OF THE DRAWINGS

Certain examples of the disclosure will now be described, by way of example only, with reference to the accompanying drawings, in which.

DETAILED DESCRIPTION

Whilst the description herein may refer to only a specific number of paralleled power converters (e.g. motor drives) configured to be able to drive one or more common load(s), it would be appreciated that the teaching herein could be applied to any number of loads, and their motor drives. For example, there could be three or more paralleled powered converters (e.g. motor drives) configured to drive (e.g. control or actuate) a common load.

It will be appreciated that references to motor drives in accordance with various embodiments herein could refer to any type of power converter, and the broadest aspects of the present disclosure are not intended to be limited to using motor drives, or providing a load in the form of a motor.

To enhance the paralleled drive operation, distributed control architectures have been proposed which utilise the global voltage demand as described in EP3916990A1 and EP4024649A1, and/or utilise a discharge term within the speed control loop as described in EP4243274A1, which are incorporated herein by reference.

Figure 2A:
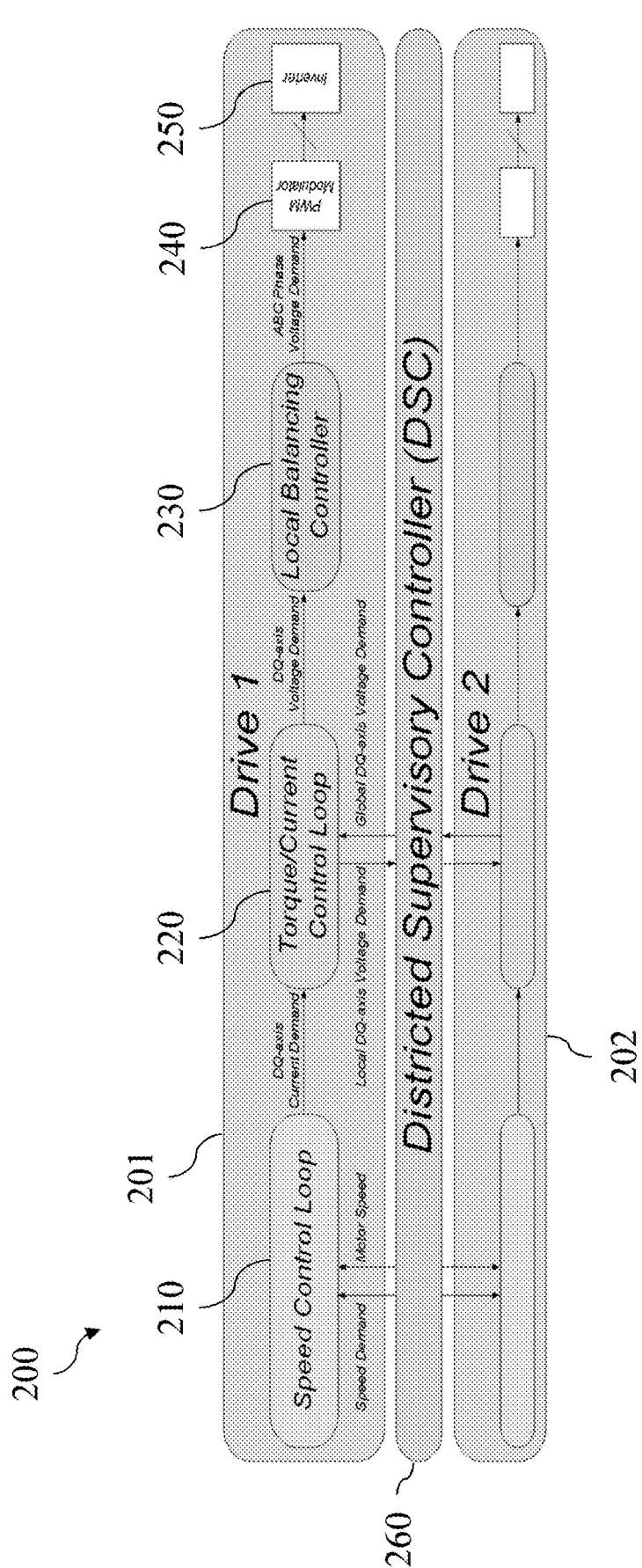
FIG. 2A shows a distributed control architecture.

As can be seen in FIG. 2A, an example distributed control architecture 200 comprises at least a first power converter (e.g. a motor drive) 201, and a second power converter (e.g. a motor drive) 202, with a central DSC 260. As would be appreciated, each power converter may comprise the same logic, whereas the Figures only shows the details of the first power converter for ease of illustration. Such an architecture may make use of the global voltage demand, and/or the discharge term as referred to above.

Each power converter may include an inverter 250. The inverter 250 may be considered to convert DC power received by each power converter into an output voltage (e.g., a three-phase AC voltage) for actuating a load. Whilst two motor drives 201, 202 are shown in FIG. 2, more could be provided as required, and as discussed herein. As would be appreciated, each inverter may have at least one associated DC-link capacitor.

As discussed above, the plurality of motor drives 201, 202 typically need some sort of common or centralised operation (e.g., control system) for example to synchronise their operation. Accordingly, the motor drives 201, 202 may be controlled centrally using the DSC 260 (e.g., processor or circuitry). The central controller 260 may be configured to control, for example, which motor drive(s) 201, 202 are to be used (e.g., selected as discussed above) at a particular time. The DSC 260 may achieve this by switching between the motor drives (e.g., the power inverters thereof) using, e.g., a modulation scheme or technique.

Each motor drive 201, 202 may include components or circuitry that form a speed loop 210 having, as an input, a reference speed for example an angular speed demand ωref (illustrated as a speed demand in the Figures), and also a motor speed om (which may be measured or calculated). The reference speed ωref would typically be given to all power converters operating in parallel, and could be set by the central controller (e.g. DSC) 260 or elsewhere (e.g., a flight control computer, or other component or module, e.g., having another control loop).

For example, a flight controller may be commanding that a component moves by actuating to a certain position at a given speed. The speed loop 210 is configured to generate a suitable current reference (e.g. DQ-axis Current Demand in the figures), which is then output to a torque/current loop 220 (described below) to regulate the output current of the motor drive, in effect regulating the speed of rotation of the motor.

The (local) torque/current control loop 220 is configured to calculate a local voltage reference Vlocal for the motor drive 201, 202 as discussed above. The current loop 220 is configured to regulate the output current of the respective motor drive 201, 202, so as to ensure the motor drives 201, 202 operating in parallel work together adequately and effectively. That is, to generate the correct currents, the output voltage of the motor drive 201, 202 needs to be set correctly. The current loop 220 (and speed loop 210) are used to calculate the local voltage reference Vlocal, (e.g. DQ-axis Voltage Demand in the figures) which is then used to generate the correct switching sequence of the motor drives 201, 202 (e.g., via the modulation technique or scheme) to facilitate this.

The DSC 260 may optionally be configured to determine or calculate a global voltage reference Vglobal based on the local output voltage references Vlocal from each of the paralleled motor drives 201, 202. The global voltage reference Vglobal may be an average or sum of the local voltage references Vlocal. The global voltage reference Vglobal may then be transmitted back to each local motor drive 201, 202, to be used as part of the modulation (e.g., to generate suitable modulation duty cycles), as described in more detail below. For example, the modulation elements may generate a suitable switching pattern for the inverters 250 based on the global voltage reference Vglobal.

Any suitable method or type of modulation may be employed in the present disclosure. In particular, the modulation may comprise pulse width modulation ("PWM") such as space vector modulation ("SVM"). Each motor drive 201, 202 may include a modulation module 240 configured to control the synchronisation of the motor drive 201, 202, for example the synchronisation of a switching frequency of the modulation, e.g., using PWM or SVM.

The modulation (e.g., PWM or SVM) module 240 is configured to generate the appropriate signals (e.g., logic and/or switching signals) for the inverter 250 of the motor drive 201, 202 (e.g., gate drivers thereof) to provide a controlled commutation of the output voltages thereof, whilst regulating the output voltages/currents of each inverter 250 to maintain consistency between the motor drives 201, 202. Thus, the modulation module 240 may be configured to send suitable such signals to the inverter 250 that control the timings associated with the respective motor drive 201, 202 (e.g., the output voltages thereof) in use. Generation of the switching signals for the inverters 250 by each respective modulation (e.g., SVM) module 240 is facilitated by the use of the global voltage references Vglobal.

Each motor drive 201, 202 may be a single power converter and the circuitry/components thereof may be located on a single circuit board (e.g., a single printed circuit board or "PCB"). The circuit boards (or "blades") holding the motor drives 201, 202 could be similar (or substantially identical), such that they comprise the same interface for communicating with the DSC 260. In this manner, the motor drives 201, 202 could be easily scaled (e.g., from using two motor drives 201, 202 to using three or more) without any modification of the motor drives 201, 202 or central controller 260.

A rack or similar structure could be used to connect a variable number of (e.g., between 2 and 20) motor drives 201, 202 to the central controller 160, in a similar manner to server racks, into which server blades can be inserted and removed easily depending on system requirements.

A distributed system, such as the distributed system 200 illustrated in the figures, may use synchronous reference frame control, which is known in the art (also called "d-q control"). Using such a control mechanism, the voltage and current can be converted into a reference frame that rotates synchronously with a voltage vector (e.g., by Park Transformation) so that three-phase time-varying signals are transformed into DC signals. Using "d-q currents" provides a convenient way of representing the output current of the motor drive, and analysing the system.

In sum, FIG. 2A illustrates a decentralized current balancing control structure, applicable to both MCD and MCMLD systems. For example, the local controller in each drive may comprises three main components: a speed control loop 210, a torque/current control loop 220, and a local balancing controller 230. Initially, the speed control loop 210 may receive the motor speed demand and the corresponding speed response from the DSC 260. The speed control loop 210 then calculates and outputs the DQ-axis current demand to the torque/current control loop. The torque/current control loop compares the local DQ-axis current demand with the current measurement, generating the local DQ-axis voltage demand sent to the DSC. The DSC calculates the average of the DQ-axis voltage demands from both drives and returns them to the torque/current control loop, which, in turn, transmits these values to the local balancing controller. The local balancing controller calculates the ABC phase voltage demands and outputs them to a modulator unit (e.g. PWM modulator unit) and subsequently to the inverter.

A local balancing controller 230 may be used within each motor drive 201, 202 that can form a supplementary element of the local control scheme. The balancing network 230 may be configured to adjust the global voltage reference Vglobal based on the local output currents of the respective inverter 250. This can help to alleviate differences in output currents between the motor drives 201, 202.

A local balancing unit 230 utilising a virtual resistor term and a zero-sequence current controller, for example, is described in EP20275090.7, which is incorporated herein by reference. An example of this may be seen in the "Type A" arrangement of FIG. 3.

Figure 2B:
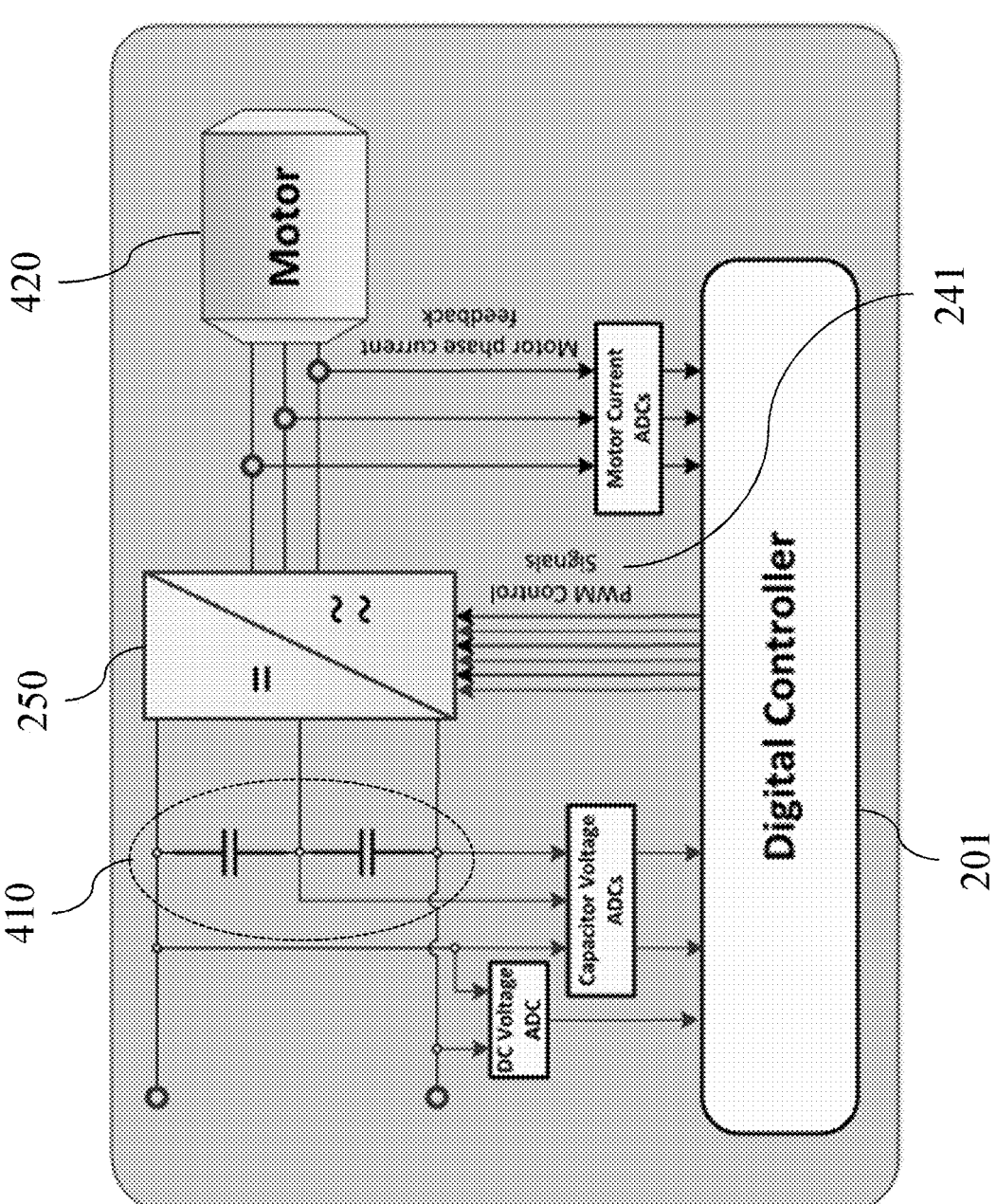
FIG. 2B shows an inverter arrangement.

An example inverter arrangement may be seen in FIG. 2B, which illustrates an inverter 250 (such as those seen in FIG. 2A), which may be configured to convert a DC input to an output three-phase AC voltage for actuating load 420 based on PWM control signals 241 (such as those output by modulation module 240), from a digital controller (such as motor drive 201). FIG. 2B additionally illustrates several feedback sources, which may be used by the digital controller, in order to calculate PWM control signals, for example as described above/below.

As seen in FIG. 2B, the arrangement further comprises at least two DC link capacitors. In the example of FIG. 2B, a 3-level converter which utilises a DC-link capacitor split into two halves (i.e. a top capacitor, and a bottom capacitor connected by a midpoint).

As would be appreciated, it is desirable to achieve capacitor balancing, i.e to result in equal voltage across the two capacitors of the same converter.

Figure 1:
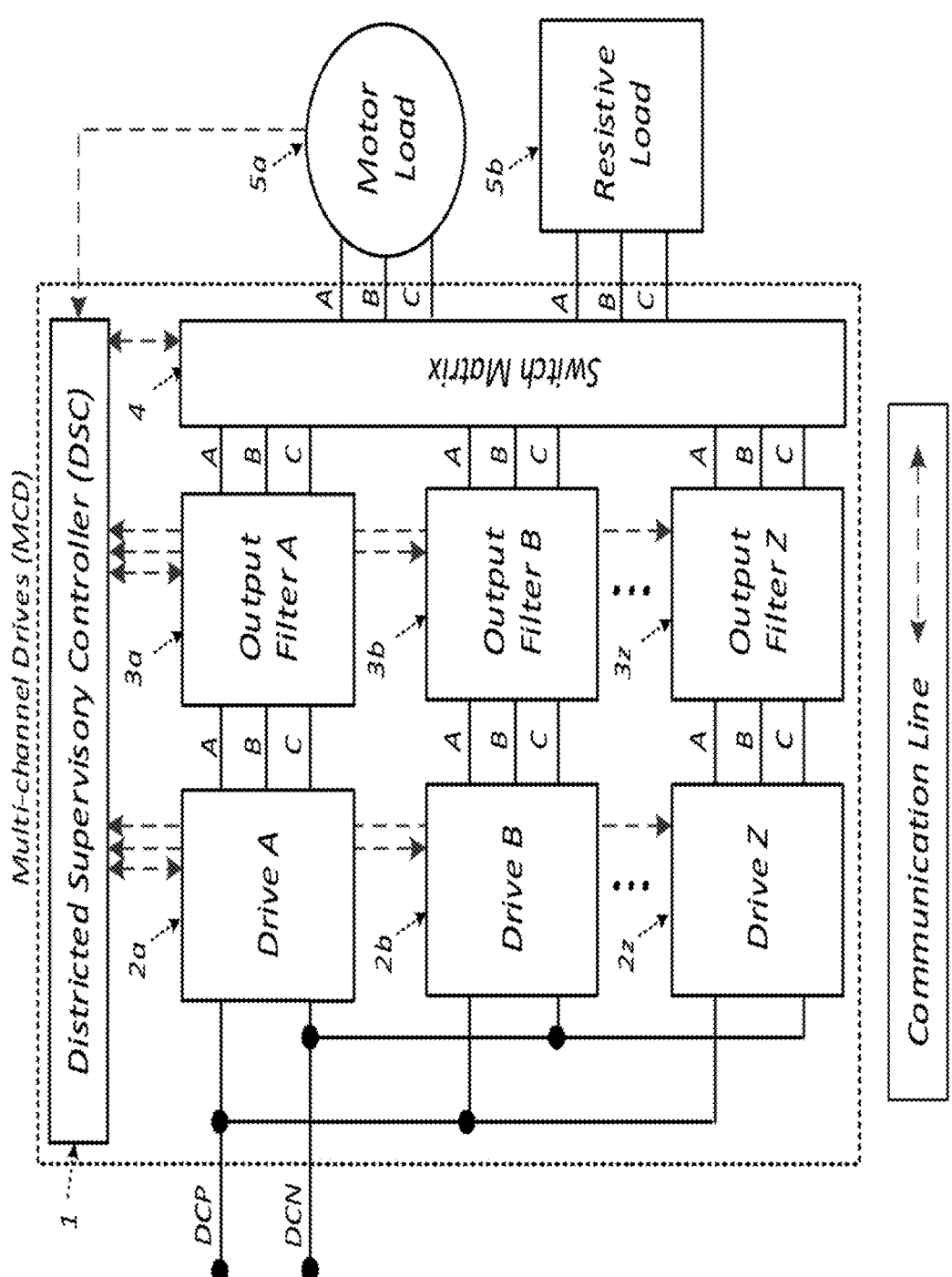
FIG. 1 shows an example multi-channel drive system.

As would be appreciated, several inverters 250 could be selectively connected to one or more loads 420, for example, via a switch matrix as shown in FIG. 1, thereby providing several paralleled converters. Even when several converters are connected in parallel, and supplied from a common DC bus, voltage across the DC link capacitors of a given one of the converters should be balanced. Whilst the total voltage across the DC link capacitors will always equal the voltage of the DC bus, the total voltage is split between the two local capacitors, and may not necessarily be equally split. The split can be different from one converter to another.

Figure 3:
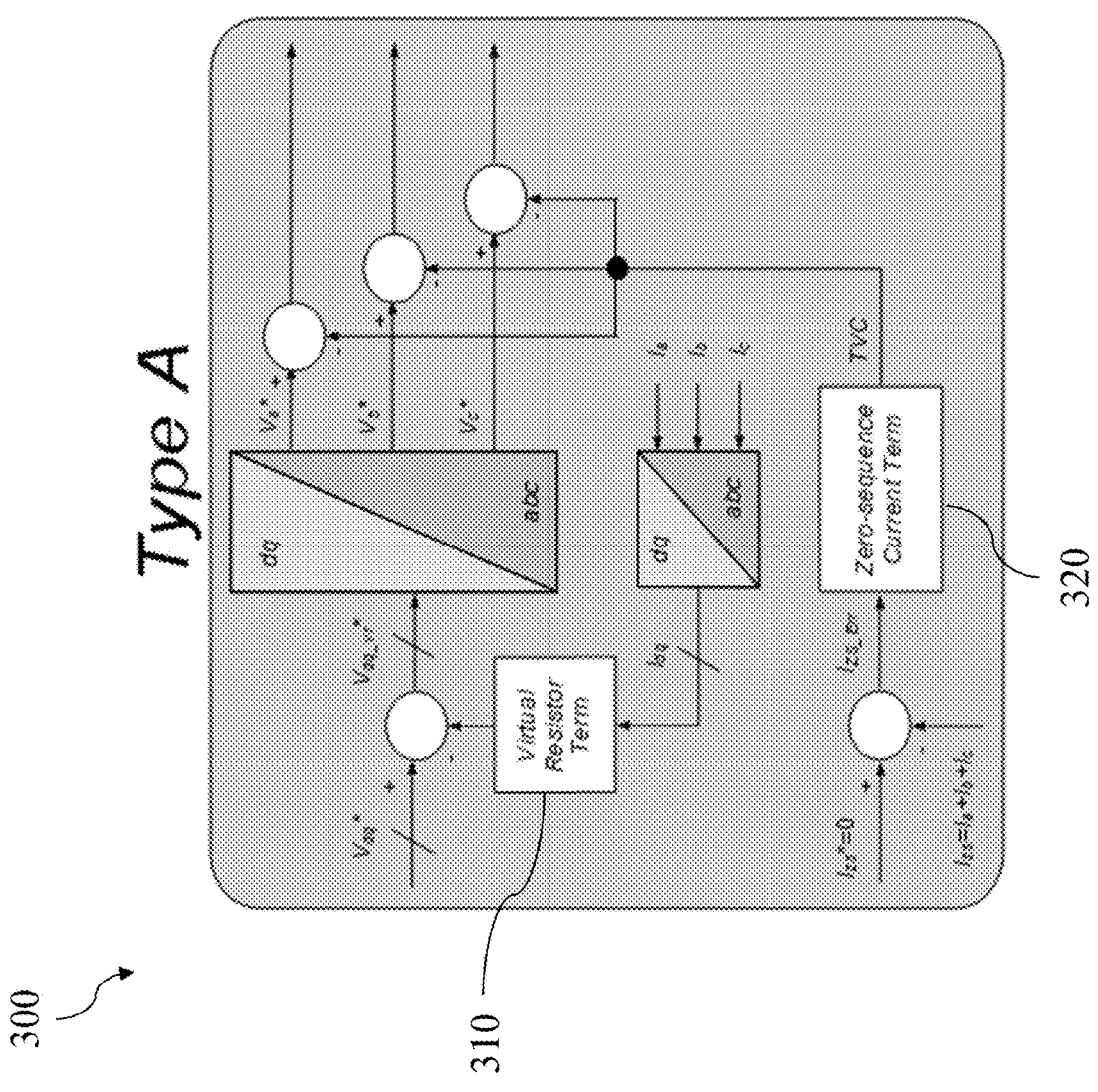
FIG. 3 shows a local balancing controller.

As can be seen in FIG. 3, local balancing unit 300 consists of a "virtual resistor" term 310 and a zero-sequence current controller 320.

The "virtual resistor" may be essentially a first feedback circuit which emulates a series resistor within the motor drive 300. The resistance value of the virtual resistor 310 can be referred to as a gain (Rv) and can be preset based on the response of the system to positive and negative circulating currents.

In this way, the local balancing unit 300 utilizes the measured/determined DQ-axis current, derived from the local phase currents, to apply voltage compensation to each drive. The principle is similar to a droop control algorithm used in distributed power generation systems. Each drive is expected to output an equal amount of phase currents to the load. If there are differences in phase currents among paralleled drives, the virtual resistor term reduces the imbalance through modifying the DQ-axis voltage demand (Vdq*), via the first feedback circuit.

In the example of FIG. 3, the first feedback circuit utilises a measured/calculated output current Ia-c converted into the DQ domain to Idq, scaled by a first gain, the virtual resistance term 310. The output is then subtracted from the voltage demand to result in a compensated DQ-axis voltage demand (Vdq*). In this way, the virtual resistor term is configured so as to reduce circulating currents between the power converter and one or more additional power converters in the parallel configuration due to imbalance of positive and/or negative sequence currents.

The zero-sequence current term 320 employs a similar concept to minimize the flow of zero-sequence current between paralleled drives. The zero-sequence current may be computed as the summation of the measured ABC output phase currents (Izs=Ia+Ib+Ic). Ideally, this sum is expected to be zero, and if not then they may be compensated by a second feedback circuit aimed at compensating for (e.g., reducing) zero sequence circulating currents.

In the example of FIG. 3, the measured zero-sequence current acts on a proportional controller represented by the "zero-sequence current term" block 320 illustrated in FIG. 3. The proportional controller output is a total voltage correction (TVC) term, subtracted from the compensated output phase voltage demands (Va*, Vb*, and Vc*).

The resulting DQ-axis voltage demand may then be converted to an ABC phase voltage demand (Va*, Vb*, and Vc*), for the modulation module 240 to generate a suitable switching pattern for the inverters 250.

However, the load balancing controller 300 may not be applicable to multi-level drives, such as the MCMCLD 100 seen in FIG. 1.

Figure 4:
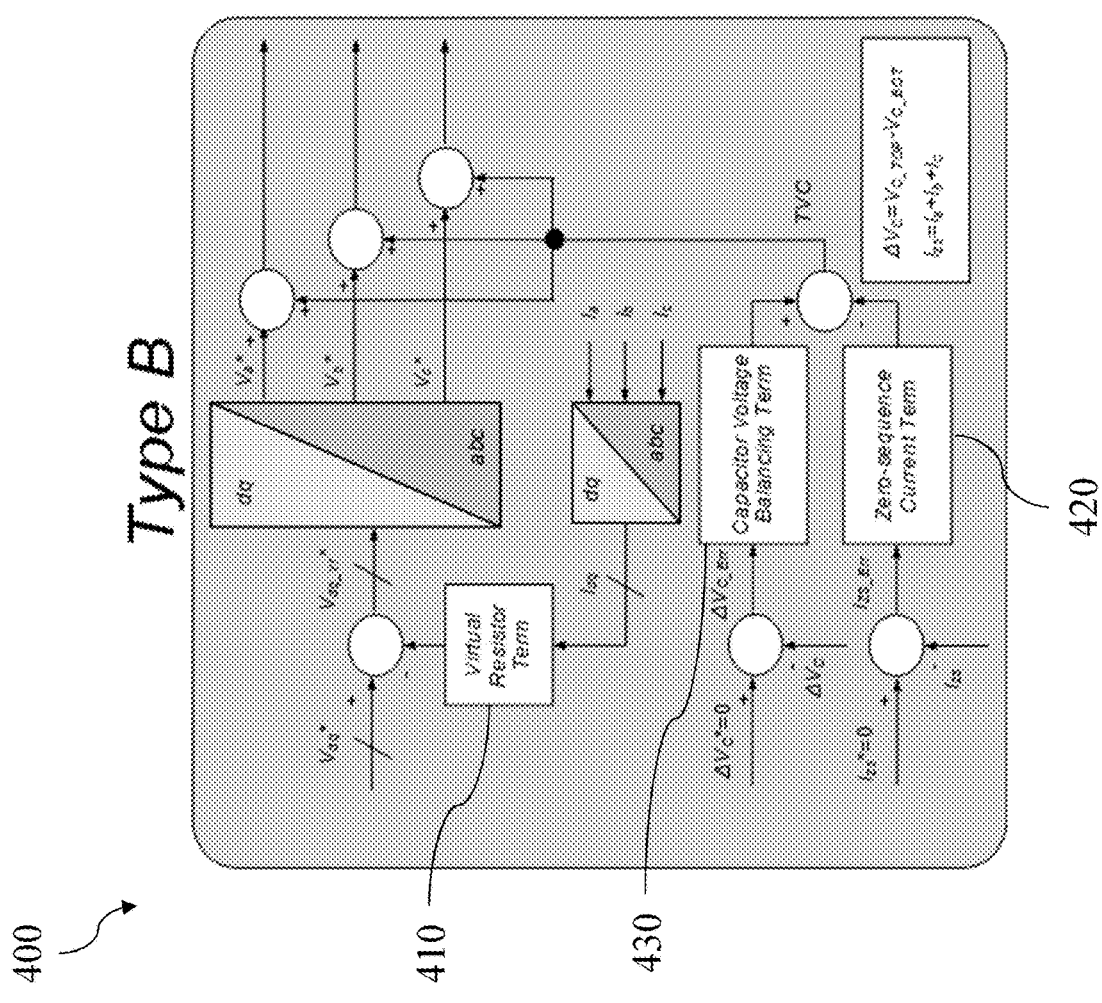
FIG. 4 shows a local balancing controller.
Figure 5:
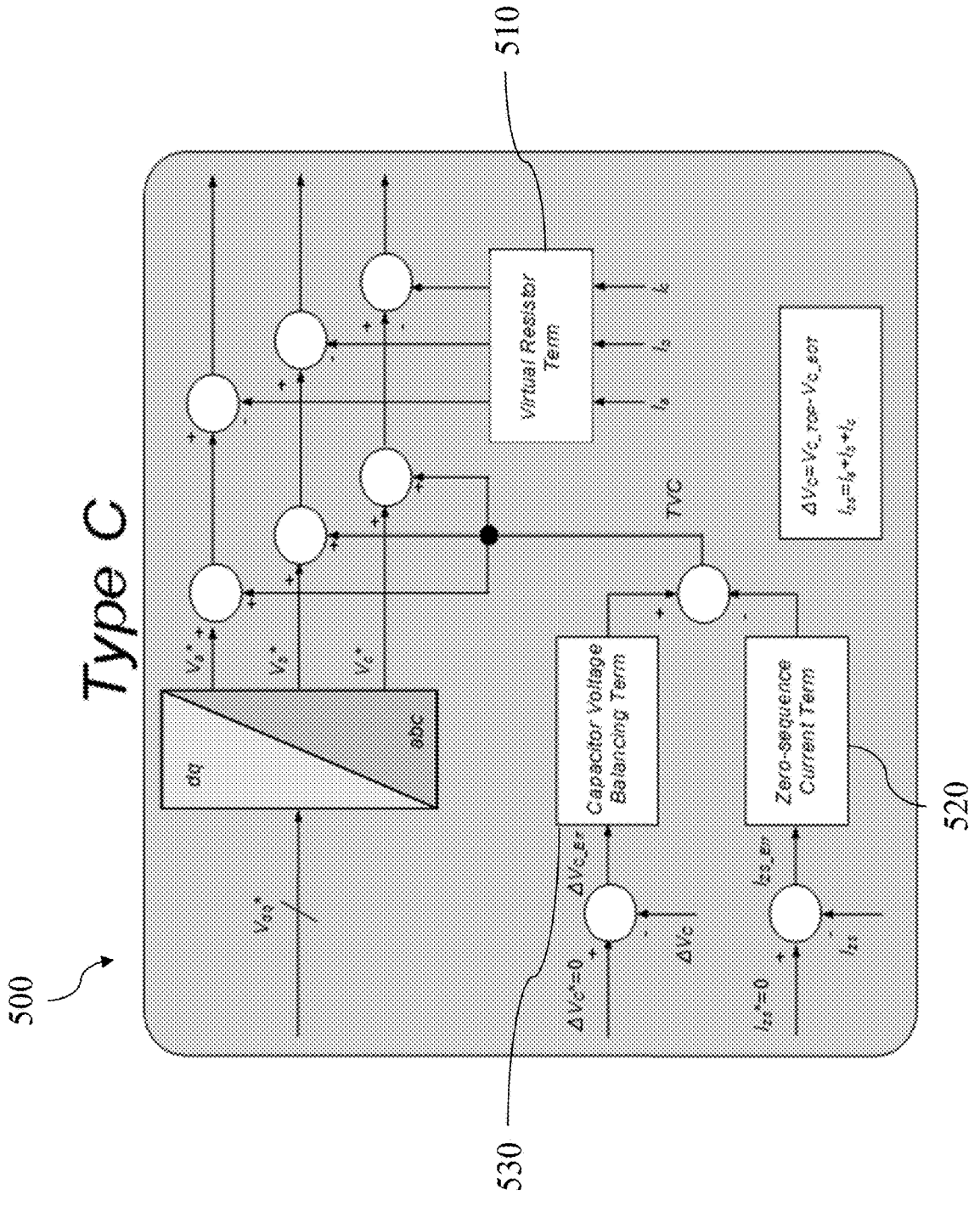
FIG. 5 shows a local balancing controller.

As outlined above, MCMLD applications may further comprise an additional capacitor voltage balancer alongside the existing controller. Therefore, in addition to the above identified issues with zero-sequence currents, capacitor voltage unbalance must also be considered. Either of these problems could cause the system to trip and/or cause permanent damage to the system components if they are not controlled Load controllers that may find use with multi-level drives may be the Type B and Type C controllers depicted in FIGS. 4 and 5 respectively. This is achieved by incorporating a capacitor voltage balancing term 430, 530 in order to balance the voltages across DC link capacitors of the respective inverters (for example, in the arrangement seen in FIG. 2B), alongside a virtual resistor term 310, 410 and a zero-sequence current controller 420, 520, within a local balancing controller 230.

Both types incorporate a capacitor voltage balancer, the virtual resistor term, and the zero-sequence current controller. The distinction between Type B and Type C lies in the implementation of the virtual resistor term, which can either be applied either in the DQ domain (as in the Type B controller 400 of FIG. 4) or in the ABC domain (as in the Type C controller 500 of FIG. 5).

The Type C controller 500 may be able to reduce the effect of imperfections in current sensor measurements (such as varying DC offsets, gain values, etc.) which result in non-ideal DQ-axis current values.

Both correction mechanisms (for capacitor voltage imbalance and for zero-sequence currents) act on the dc-offset of the phase voltage demands. However, this means that there are more quantities to control than the total number of degrees of freedom in the system.

In order to mitigate capacitor voltage imbalances, the drives may need to increase the DC-offset of the phase voltage demands. This may, however, be in conflict with the need to reduce zero-sequence current, where the drives may need to lower the same DC-offset.

As a result, in both Type B and Type C controllers, two proportional controllers are used. One controller 430, 530 acts on the capacitor voltage imbalance (ΔVc), for example, when used with an inverter having a DC-link capacitor split into two halves connected by a midpoint (for example, as seen in FIG. 2B), on the difference between the top capacitor voltage and the bottom capacitor voltage. The other controller 420, 520 acts on the zero-sequence current, similar to the manner in which the zero-sequence current term 320 is utilised. The demands of the two proportional controllers are subtracted from one another to calculate the total phase voltage demand offset. The result is a compromise where the positive total voltage correction (+TVC) for the capacitor balance control counters the negative total voltage correction (−TVC) generated by the zero-sequence current controller.

In this way, the controllers 400 and 500 comprise a first feedback circuit comprising a first gain, a virtual resistor term 410, 510 in order to reduce circulating currents between the power converter and one or more additional power converters in the parallel configuration due to imbalance of positive and/or negative sequence currents. The first feedback circuit may be applied in either the DQ domain (as in the Type B controller 400 of FIG. 4) or in the ABC domain (as in the Type C controller 500 of FIG. 5).

As would be appreciated, the first gain may be set such that, for a range of values of the output current, a value of the first gain is chosen that reduces circulating currents between the power converter and one or more additional power converters in the parallel configuration due to imbalance of positive and/or negative sequence currents. It will be appreciated that differences exist between various systems, but the skilled person could choose or determine suitable values for the first gain using any suitable technique. For example, the first gain could be preset or otherwise predetermined as part of a calibration or pre-processing routine.

The first gain could be preset or predetermined using frequency response analysis, e.g., a Bode plot analysis, so as to provide values of the first gain to be applied to the range of values of the output current that reduce the circulating currents between the power converter and one or more additional power converters in the parallel configuration due to imbalance of positive and/or negative sequence currents as aforesaid.

In addition or alternatively the controllers 400 and 500 may comprise a second feedback circuit, which balances the need to mitigate DC-link capacitor voltage imbalances (such as those discussed above), and the need to reduce zero-sequence current. The second feedback circuit may therefore comprise a first controller 430, 530 that is configured to calculate a first DC offset to mitigate capacitor voltage imbalances, and a second controller 420, 520 that is configured to calculate a second DC offset to reduce zero-sequence current. The second DC offset may then be subtracted from the first DC offset so as to result in a total voltage correction (TVC), which then may be used to offset the voltage demand output by the controller 400, 500.

The first DC offset may be based on a measured DC-link capacitor voltage imbalance of the associated inverter, for example the measured DC-link capacitor voltage imbalance may be a difference between the voltage of a top capacitor, and a bottom capacitor of a split DC-link capacitor having halves connected by a midpoint. The first controller 430, 530 may be configured to scale the measured DC-link capacitor voltage imbalance by a second gain in order to provide the first DC offset. In this way, the second gain may be selected so as to minimise the DC-link capacitor voltage imbalance.

Again, it will be appreciated that differences exist between various systems, but the skilled person could choose or determine suitable values for the second gain using any suitable technique. For example, the second gain could be preset or otherwise predetermined as part of a calibration or pre-processing routine.

Similarly, the second DC offset may be based on a summation of measured/calculated local currents of the inverter, and thereby the zero sequence circulating current. The second controller 420, 520 may be configured to scale the measured/calculated currents by a third gain in order to provide the second DC offset. In this way, the third gain may be selected so as to minimise the zero-sequence current.

Again, it will be appreciated that differences exist between various systems, but the skilled person could choose or determine suitable values for the third gain using any suitable technique. For example, the third gain could be preset or otherwise predetermined as part of a calibration or pre-processing routine.

The resulting voltage demand (which has been compensated by the first feedback circuit and/or the second feedback circuit) may then output an adjusted phase voltage demand for the modulation module 240 to generate a suitable switching pattern for the inverters 250. The adjusted phase voltage demand may therefore minimise circulating currents between the power converter and one or more additional power converters in the parallel configuration, and/or mitigate capacitor voltage imbalances, and/or reduce zero sequence current.

The system may therefore be configured to minimize both capacitor voltage unbalance and zero-sequence currents, which therefore mitigates problems that could cause the system trip and/or permanent damage to the system components if they are not controlled.

In addition, thermal management of the drive switching modules may be improved by reducing devices switching losses and conduction losses, as these are directly affected by capacitor voltage imbalance and zero-sequence currents.

Furthermore, such control allows for improved efficiency and performance of multi-level drives. The inclusion of the capacitor voltage balancer, in conjunction with the virtual resistor term and zero-sequence current controller, in Type B and Type C controllers which are specifically designed for multi-level drives, addresses the unique challenges faced by such systems. By effectively compensating for voltage and current imbalances, these controllers improve the efficiency and overall performance of multi-level drives.

Therefore, such systems offer several advantages, including improved control performance, enhanced current balancing, reduced voltage and current fluctuations, compatibility with different drive configurations, improved efficiency and performance of multi-level drives, and a decentralized control structure. These benefits contribute to the overall stability, reliability, and effectiveness of the motor-drive system.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A power converter for providing power to one or more loads, wherein the power converter is configured to be arranged in a parallel configuration with one or more additional power converters and comprises:

a load balancing controller configured to receive an input voltage demand and output a compensated output voltage demand;

an inverter for receiving an input voltage and converting the input voltage to an output voltage having an associated output current, the inverter comprising at least two DC-link capacitors; and a module configured to modulate the output voltage using a modulation scheme based on the compensated output voltage demand;

wherein the load balancing controller comprises:

a first feedback circuit configured to generate a first signal, wherein the first signal is generated based on a first measurement/calculation of the output current of the inverter scaled by a first gain, wherein the first gain is set so as to reduce circulating currents between the power converter and one or more additional power converters in the parallel configuration due to imbalance of positive or negative sequence currents; and a second feedback circuit comprising a first controller configured to calculate a first DC offset to mitigate DC-link capacitor voltage imbalances of the inverter, and a second controller that is configured to calculate a second DC offset to reduce zero-sequence current, wherein the second DC offset is subtracted from the first DC offset so as to result in a total voltage correction, TVC, signal;

wherein the load balancing controller is configured to compensate the received voltage demand using the first signal and the TVC signal to result in the compensated output voltage demand.

2. The power converter of claim 1, wherein:

the received input voltage demand is or allows for determination of a DQ-axis input voltage demand; and the load balancing controller is configured to convert the received DQ-axis input voltage demand to a corresponding ABC phase voltage demand, such that compensated output voltage demand is an ABC phase voltage demand.

3. The power converter of claim 2, wherein:

the load balancing controller is configured to apply the first signal to the DQ-axis input voltage demand to provide a compensated DQ-axis voltage demand, and to subsequently convert the compensated DQ-axis voltage demand to a corresponding ABC phase voltage demand; and the load balancing controller is configured to apply the TVC signal to each phase of the corresponding ABC phase voltage demand so as to result in the compensated output voltage demand.

4. The power converter of claim 2, wherein:

the load balancing controller is configured to convert the DQ-axis input voltage demand to a corresponding ABC phase voltage demand; and wherein the load balancing controller is configured to apply both the first signal and the TVC signal to each phase of the corresponding ABC phase voltage demand so as to result in the compensated output voltage demand.

5. The power converter as claimed in claim 1, wherein the first gain is set such that, for a range of values of the output current, a value of the first gain is chosen that reduces circulating currents between the power converter and one or more additional power converters in the parallel configuration due to imbalance of positive or negative sequence currents.

6. The power converter of claim 5, wherein the first gain is preset as part of a calibration or pre-processing routine.

7. The power converter of claim 1, wherein the first controller is configured to calculate the first DC offset based on a measured DC-link capacitor voltage imbalance of the associated inverter.

8. The power converter of claim 7, wherein the measured DC-link capacitor voltage imbalance is a difference between the voltage of a top capacitor, and a bottom capacitor of a split DC-link capacitor having halves connected by a midpoint.

9. The power converter of claim 8, wherein the measured DC-link capacitor voltage imbalance is scaled by a second gain in order to provide the first DC offset; and wherein the second gain is preset or otherwise predetermined as part of a calibration or pre-processing routine.

10. The power converter of claim 2, wherein the second controller is configured to calculate the second DC offset based on a summation of measured/calculated local currents of the inverter.

11. The power converter of claim 10, wherein the summation of measured/calculated local currents of the inverter scaled by a third gain in order to provide the second DC offset; and wherein the third gain is preset as part of a calibration or pre-processing routine.

12. The power converter as claimed in claim 1, wherein the input voltage is a DC input voltage and the output voltage is a three-phase output voltage.

13. The power converter as claimed in claim 1, wherein the modulation scheme includes pulse width modulation.

14. A multi-channel drive (MCD) (MED) configured to provide power to at least one load, the MCD comprising:

a central controller;

a plurality of power converters each power converter being a power converter as claimed in claim 1 and each having a corresponding output filter, filter: wherein each power converter and corresponding output filter is arranged in parallel with one another; and a switch matrix;

wherein the central controller is operable to configure any number of the plurality of power converters to supply power to the at least one load through the switch matrix depending on the demand of the at least one load.

15. A system comprising, a plurality of loads; and the MCD of claim 14, wherein the central controller is operable to configure any number of the plurality of power converters to supply power any of the plurality of loads through the switch matrix, depending on the demand of the load(s).

* * * * *